Nov. 4, 1930. N. D. LEVIN Re. 17,855

MINING MACHINE

Original Filed Feb. 12, 1914 4 Sheets-Sheet 1

INVENTOR
Nils D. Levin
H. J. Bliss
ATTORNEY

Nov. 4, 1930. N. D. LEVIN Re. 17,855

MINING MACHINE

Original Filed Feb. 12, 1914 4 Sheets-Sheet 2

Nov. 4, 1930. N. D. LEVIN Re. 17,855

MINING MACHINE

Original Filed Feb. 12, 1914 4 Sheets-Sheet 3

Inventor

Nils D. Levin

By H. H. Bliss

Attorney

Nov. 4, 1930. N. D. LEVIN Re. 17,855
MINING MACHINE
Original Filed Feb. 12, 1914 4 Sheets-Sheet 4
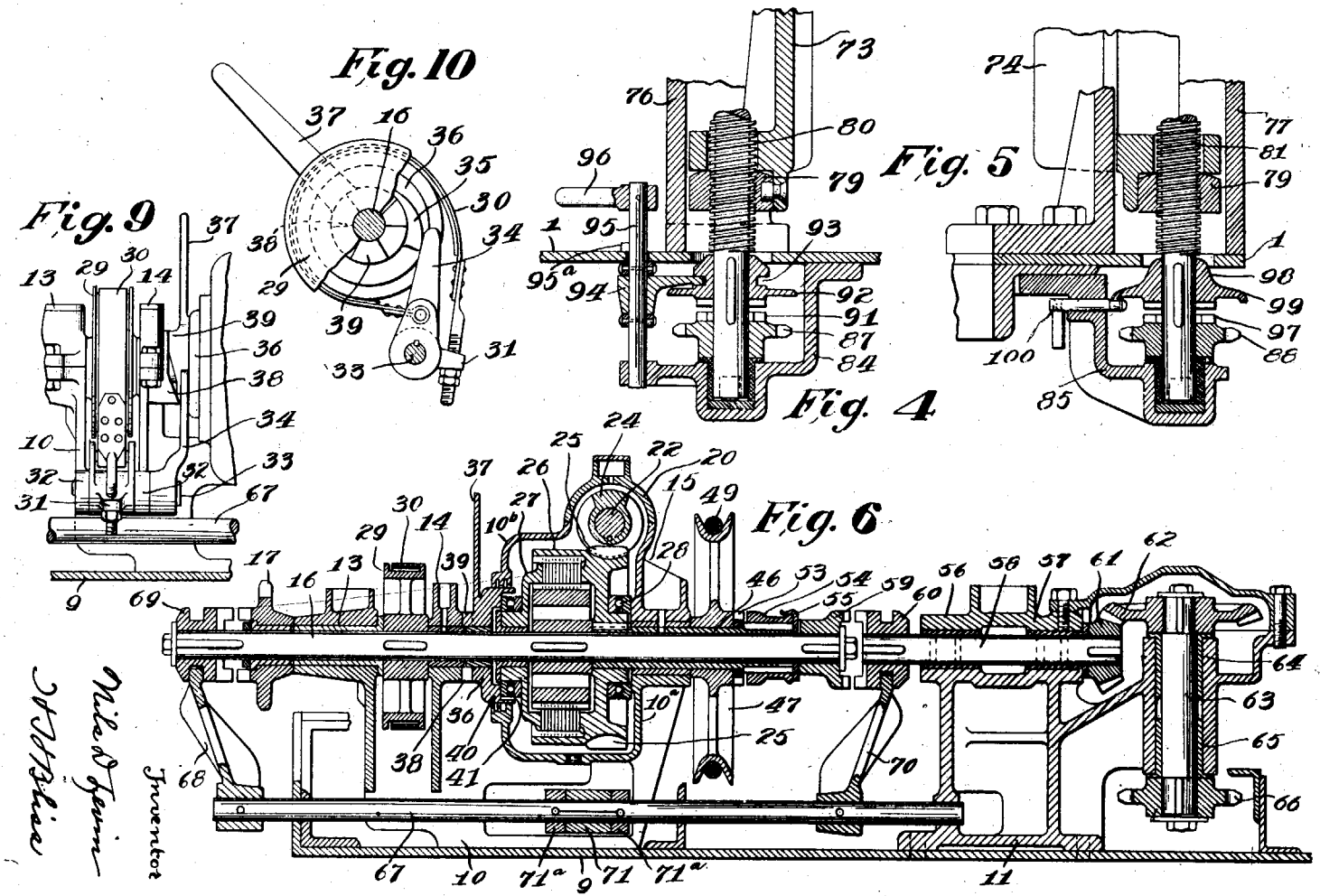
Inventor
Nils D. Levin
H. J. Bliss
By
Attorney Reissued Nov. 4, 1930

Re. 17,855

UNITED STATES PATENT OFFICE

NILS D. LEVIN, OF COLUMBUS, OHIO, ASSIGNOR TO THE JEFFERY MANUFACTURING COMPANY, OF COLUMBUS, OHIO, A CORPORATION OF OHIO

MINING MACHINE

Original application filed February 12, 1914, Serial No. 818,314. Renewed January 3, 1920, Serial No. 349,350. Original No. 1,353,054, dated September 14, 1920. Application for reissue filed December 3, 1921. Serial No. 519,788.

The invention relates especially to mining machines of the class in which each is provided with its own track wheels and is adapted to perform the cutting operations while supported on the said track wheels. Earlier machines devised by me for this general class of work were characterized by certain novel features, to wit, each had an elongated horizontally extending cutter arm mounted with a wide bearing support directly over the wheel base so as to swing across the front of the machine from one side to the other of a supporting track to cut a horizontally extending kerf; each had means for adjusting the cutter arm vertically to vary the height of the kerf; and each was adapted to move over the mine tracks under its own power, so that it could travel into a mine room, approach the coal face over a centrally arranged track and, while standing on the track adjacent the face, by one continuous sweep of the cutter arm cut a horizontal kerf extending from rib to rib, thereupon moving under its own power to another room to repeat the cutting operation. But with these earlier machines it was impossible to cut a kerf at or near the floor of the mine, the vertical adjustment of the cutter arm was effected somewhat inconveniently by hand, and it was necessary to move the cutter arm to a certain position before power could be applied to the track wheels to transport the machine.

The objects of my present invention are to provide a machine of the character of these earlier machines adapted to cut the kerf at or near the mine floor, having an improved mechanism for adjusting the cutter arm to different heights and inclinations and improved power mechanism for driving the track wheels regardless of whether the cutter arm is in any certain position as aforesaid. Other objects will be apparent from the following description and claims.

The accompanying drawings show one embodiment of my invention, but I desire it to be understood that I do not limit myself to the exact form of construction which I have chosen for purposes of illustration.

Of the drawings,

Fig. 4 is a sectional view upon an enlarged scale taken along the line 4—4 of Fig. 1;

Fig. 5 is a sectional view upon an enlarged scale taken along the line 5—5 of Fig. 1;

Fig. 6 is a sectional view upon an enlarged scale taken along the line 6—6 of Fig. 1;

Fig. 9 is a fragmentary view of the brake and associated parts;

Fig. 10 is a fragmentary view partly in section of the parts shown in Fig. 9.

Figure 11 is a vertical section of the pawl element of the feeding mechanism and its control devices.

Figure 12 is a vertical section of the friction drum for the cable and its control devices.

Figure 13 is a top plan of the pawl mechanism shown in Fig. 11.

Figure 1:
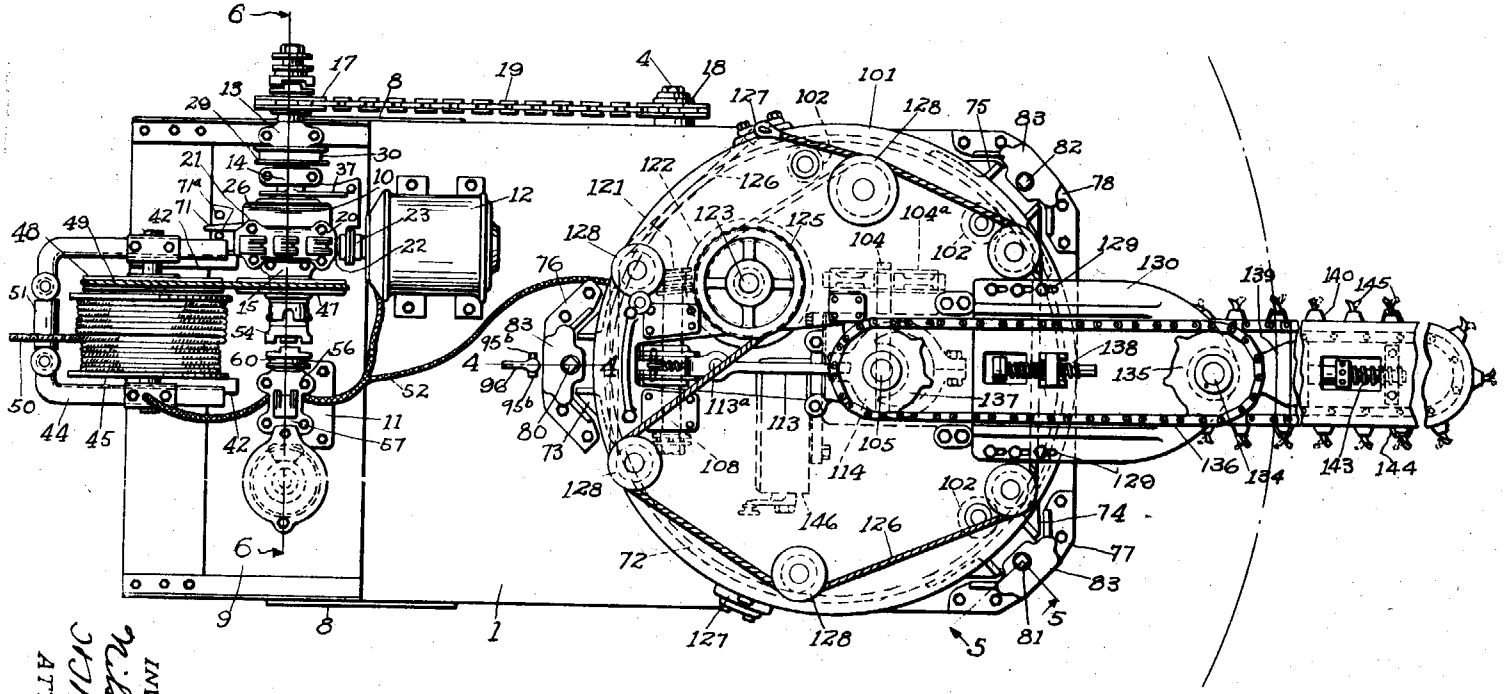
Figure 1 is a plan view of the machine.
Figure 2:
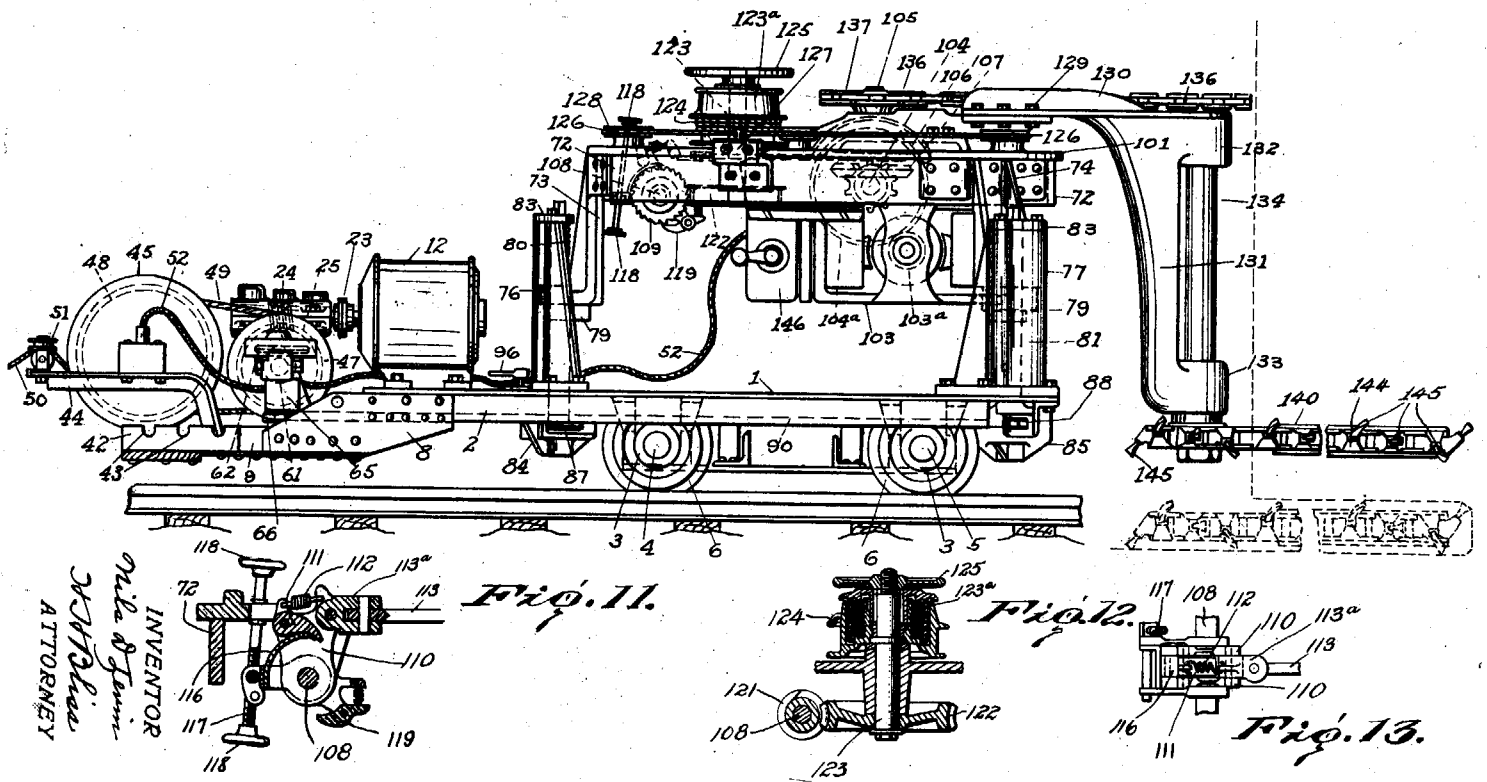
Fig. 2 is a side elevation of the machine.
Figure 3:
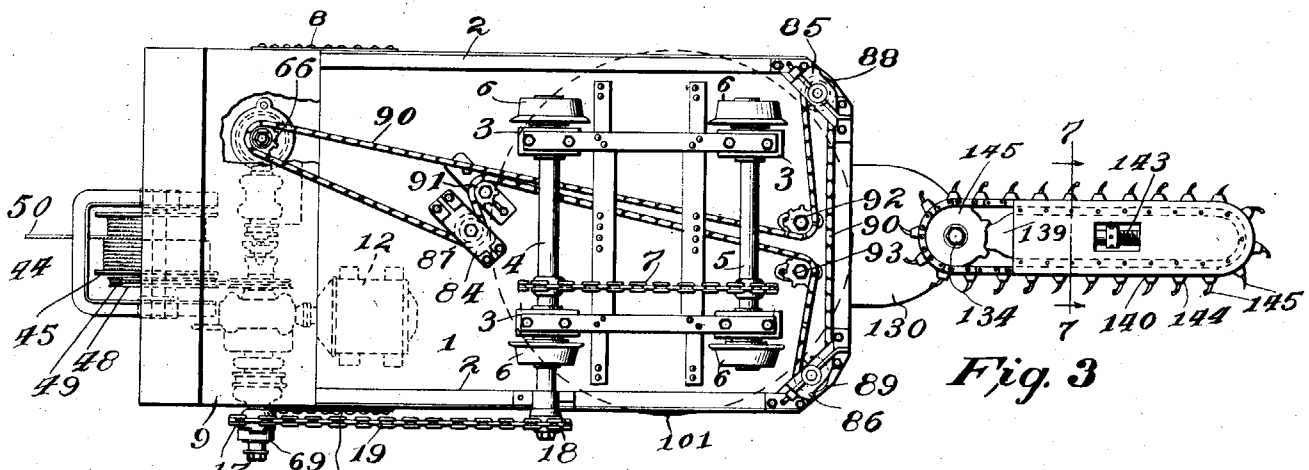
Fig. 3 is a bottom view of the machine with parts broken away.
Figure 7:
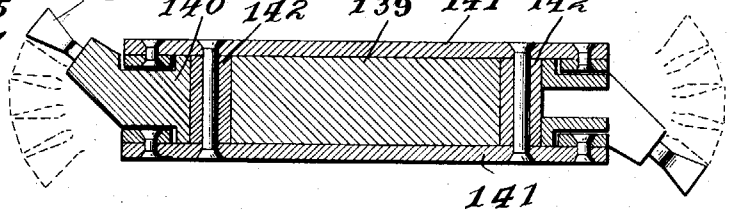
Fig. 7 is a sectional view upon an enlarged scale taken through the cutter frame along the line 7—7 of Fig. 3.

Referring to the drawings, 1 represents a steel plate to the edges of which are secured stiffening angles 2, and which is otherwise reinforced to produce a rigid base frame. Upon this base frame is mounted the coal cutting mechanism. Fixed to the underside of the plate 1 are suitable axle boxes 3 in which are journaled the axles 4 and 5, having wheels 6 adapted to travel along the rails of the mine tracks. The above described base frame together with the wheels constitute what will be termed the base of the entire apparatus. The axles 4 and 5 are connected together by the chain 7 which engages with suitable sprocket wheels secured to the axles. Attached to the side angles 2 are brackets 8 which support an extension platform 9 upon which is mounted the controlling mechanism and which affords a convenient place for the operator to ride while the machine is in transit.

Mounted upon the truck extension 9 are two castings 10 and 11 which support the transmission mechanism by which the motor 12 is connected with the several auxiliary elements of the machine.

Carried by the casting 10 are bearings 13, 14 and 15, in which is journaled a transverse shaft 16. At one end of the shaft 16 is mounted a sprocket wheel 17 in alinement with a similar sprocket wheel 18 on the axle 4. A chain 19 connects the two sprocket wheels. Formed as a part of the casting 10 is the lower half of a clutch and gear case $10^a$. The upper half of the clutch and gear case is formed by the casting $10^b$. The casting $10^b$ carries bearings 20 and 21 in which is journaled a longitudinal shaft 22 having at its forward end a flange shaft coupling 23 by which it is connected with the armature shaft of the motor 12. Secured to the shaft 22 is a worm 24 which meshes with the worm wheel 25, rotatably mounted on the shaft 16 to which it may be operatively connected by means of a clutch 26 of the well known friction disk type. This clutch 26 is shown in the drawings but need not be described in detail. The disk 27 is provided for applying pressure to the disks of the clutch and a ball bearing 28 is provided for carrying the pressure.

Rigidly mounted on the shaft 16, preferably between the bearings 13 and 14, is a brake wheel 29 which is engaged by a friction band 30. One end of the brake band is adjustably secured to one arm of a bell-crank 31 and the other end is connected pivotally to a second arm of the same bell-crank. The bell-crank is secured to a short transverse rock shaft 33 mounted in suitable bearings 32, 32 in the casting 10. The rock shaft 33 carries also an upstanding arm 34 which is adapted to be engaged by a cam 35 on the collar 36 loosely mounted on the shaft 16. The collar 36 can be moved by means of a hand lever 37, and it will be obvious that when the collar is moved, the cam 35 will engage the arm 34 to move it to tighten the brake band 30. The casting 10 at points adjacent the bearing 14 is provided with a series of inclined teeth 38, and the collar 36 is provided with a series of oppositely inclined teeth 39 adapted to mesh with the teeth 38. The collar has formed upon it a flange 40, and between this flange and the plate 27 there is interposed a ball bearing 41. The surfaces of the teeth 38 and 39 are so inclined that when the collar is rotated in a direction to release the brake, the collar is forced longitudinally of the shaft and its motion is transmitted through the ball bearings 41 to the plate 27 to press together the disks of the clutch 26. When the collar is rotated in the other direction, the brake is applied and the clutch is released.

Preferably I provide at the rear of the truck a rotatable reel upon which can be wound an electric conductor cable for the supply of current to the motors of the mining machine and truck. The free end of the cable is adapted to be connected to a suitable source of electric current supply and the current passes through the cable and from it through suitable connections to the motors. Mechanism is provided for automatically winding up the cable on the reel when the truck is advanced toward the point of cable attachment, and when the truck is moving away from the point of cable attachment the reel is permitted to turn in the unwinding direction under frictional resistance. In the construction which I have indicated for purposes of illustration, there are provided on the truck extension 9, two reel supporting bars 42, 42, these being preferably angle-shaped in cross section. The vertical legs of these angles are provided with notches 43 adapted to receive the lower ends of the reel frame 44 which is in the form of an inverted U. Mounted on the frame for rotation about a horizontal axis is a reel 45. Attached to the worm wheel 25 to rotate with it, independently of the shaft 16, is a sleeve 46 upon which is loosely mounted a rope sheave 47 in alinement with a rope sheave 48 attached to one side of the cable reel 45. An endless belt 49 passes over these two sheaves. The sheave 47 is loosely mounted on the sleeve 46 and is provided with clutch teeth 53 adapted to mesh with similar teeth on the clutch member 54 splined on the sleeve 46. This clutch member 54 can be slid along the sleeve into or out of operative position, and is frictionally held against accidental movement in either direction by the spring clip 55. The rope 49 serves not only to drive the cable reel when the clutch teeth 53 and 54 are engaged and when the worm wheel 24 is rotated, but also serves to support the cable reel and reel frame in the position indicated in the drawings. 50 represents the electric conductor cable which is wound upon the reel. At 51 a suitable guide support is provided for controlling the cable 50. 52 represents the flexible conductor extending between the cable reel and the motor 12 and the motor of the coal cutting mechanism. The conductor is of sufficient length to give the required freedom of movement to the parts of the cutting mechanism.

Carried by the casting 11 are bearings 56 and 57 in which is journaled a shaft 58 in alinement with the shaft 16. The shafts 16 and 58 can be connected by a jaw clutch, one member 59 of which is attached to the shaft 16, and the other member 60 of which is splined to the shaft 58. Fixed to the other end of the shaft 58 is a bevel pinion 61, meshing with a bevel gear 62 which is attached to a vertical shaft 63 supported in bearings 64 and 65 of the casting 11. The shaft 63 carries at its lower end a sprocket wheel 66 for a purpose which will be hereinafter set forth.

Mounted for longitudinal movement in suitable apertures of the castings 10 and 11 is a shaft 67. To this shaft near one end is secured a shifting arm 68 adapted to engage with a clutch member 69, by which the sprocket wheel 17 is connected to the shaft 16. To the shaft 67 near its other end is secured a shifting arm 70 adapted to engage the clutch member 60. By means of the shaft the two clutch members can be simultaneously moved. The relation of this shaft 67 and the arms 68 and 70 to the clutches is such that only one of these clutches may be engaged at any one time and that both may be disengaged if desired. The lever 71, attached to the shaft 67 between two collars 71[a] and 71[a], serves as a convenient means for shifting these clutches into or out of operative position. A pin projecting from the lower side of the lever 71 engageable with suitable apertures in the floor plate 9, serves to prevent accidental movement of the shaft and clutch members.

Supported for vertical adjustment relative to the base plate 1 is a supporting frame in the form of an annular ring 72, adapted to support the coal cutting mechanism as will hereinafter appear. To this ring 72 are attached depending brackets 73, 74, and 75, the lower ends of which are shaped to engage respectively with upstanding guide members 76, 77 and 78, which are secured to the base plate 1 and which serve to prevent lateral movement of the ring and attached parts relative to the truck. Secured to these depending brackets are screw nuts 79, which engage with adjusting screw shafts 80, 81 and 82, supported at their top ends by bearing plates 83 attached to the upstanding guide members, and at their lower ends in step bearings formed in the bearing brackets 84, 85 and 86 attached to the lower side of the base plate 1. The three sets of screw shafts and guide members constitute upright supports for the annular supporting frame, and the latter can be adjusted vertically in parallelism or angularly by suitable rotation of the screw shafts. Mounted for free rotation upon the screw shafts 80, 81 and 82 are sprocket wheels 87, 88 and 89 which are driven by the chain 90 from the sprocket wheel 66. Idler sprockets 91, 92 and 93 serve to quide the chain 90. The sprocket 87, as shown in Fig. 4, has, formed upon its upper surface, clutch teeth 91 adapted to engage with similar teeth on the clutch member 92, splined to the screw shaft 80. The clutch member 92 is provided with a groove 93 in engagement with an arm 94 attached to a vertical shaft 95 which extends through the floor plate 1, and is provided with a convenient handle 96 by which the movement of the clutch member 92 may be controlled. The shaft 95 carries a key 95[a] adapted to support the shaft when the handle 96 is in the position shown. When the handle is turned the key 95[a] is brought into alinement with one of the notches 95[b], 95[b] in the plate 1 and the shaft can be raised or lowered.

The sprocket wheels 88 and 89 are also provided with clutch teeth 97, as is shown in Fig. 5, which are adapted to engage with the teeth of the clutch members 98, splined to the screw shafts 81 and 82. These clutch members 98 are provided with flanges 99 which extend so near to the edges of the floor plate 1 that they may be lifted by the fingers of the operator. Horizontally movable pins 100 are provided, by which these clutch members may be locked out of engagement.

By the mechanism last described the power of the motor 12 may be applied to any, or all, of the adjusting screw shafts to effect the vertical adjustment of the ring 72 and with it of the cutting mechanism mounted thereon.

The top ends of the adjusting screw shafts 80, 81 and 82 are formed square to admit of manual adjustment with a suitable wrench.

101 is a casting which forms the main frame of the coal cutting mechanism, and rests directly upon the upper edge of the ring 72, forming a turntable which is rotatable about the center of the ring. This table and its attachments are somewhat conventionally illustrated, but being substantially the same as the table and attachments in my copending application No. 545,337, reference may be had thereto for the details of these parts. The turntable is held against horizontal displacement by means of rollers 102 which engage the inner surface of the ring. 103 is an electric motor secured to the under side of the turntable. This motor is connected with the main horizontal power shaft 104 by means of a pinion 103[a] on the motor shaft and a gear 104[a] on the shaft 104. A vertical power shaft 105 is operatively connected with the shaft 104 by means of a bevel pinion 106 and a bevel gear 107.

108 is a horizontal shaft mounted in suitable bearings on the under side of the turntable. This shaft 108 carries a ratchet wheel 109 near its center. Pivotally mounted at each side of the ratchet wheel 109 are arms 110 between which there is pivotally mounted a pawl 111 which is normally held in engagement with the ratchet wheel by means of a spring 112. The arms 110 are oscillated about their pivoted axis by means of a link 113 which is connected therewith by means of a knuckle joint 113[a], and is connected at its other end to the eccentric strap 114 of the eccentric 115 which is mounted on the shaft 105, being preferably formed as part of the gear 107. 116 is an arcuate finger mounted concentrically with the ratchet wheel 109, and adapted to be oscillated about the axis of the wheel by means of the threaded rod 117 and the hand wheels 118. 119 is a second pawl normally engaging the ratchet wheel 109. This pawl is held in place by means of a spring 120. The details of the threaded rod, its mounting support the finger 116 and other parts just referred to are shown also in U. S. Patents 1,247,419, November 20, 1917, and 1,267,675, May 28, 1918.

Figure 8:
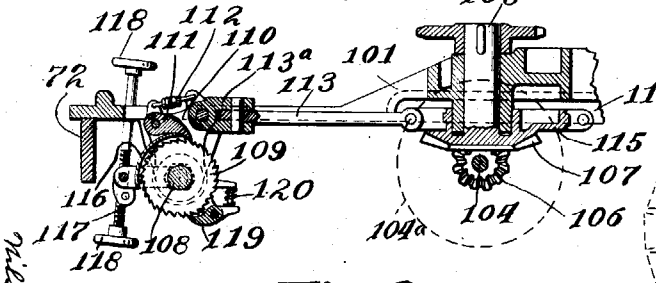
Fig. 8 is a detail view partly in section showing some of the elements of the feeding mechanism.

In operation when the shaft 105, together with the eccentric 115, is being continuously rotated, oscillatory movement is given to the arms 110 and the pawl 111, which movement is transmitted to the shaft 108 by means of the ratchet wheel. The finger 116 serves to hold the pawl out of engagement with the ratchet wheel during part of its movement. By varying the position of the finger, the pawl may be held inoperative during a greater or lesser part of its movement, and the rate of rotation of the ratchet wheel and the shaft 108 may be regulated. As shown in Fig. 8 the eccentric is at the extreme end of its throw and the finger 116 is shown adjusted to the position where the pawl 111 is idle in relation to the ratchet wheel. But it will be seen that the rod 117 can be turned to lower the upper edge of the finger 116 to permit the pawl to advance one tooth of the ratchet or two teeth or more as desired. When the finger 116 is elevated to hold the pawl idle the shaft 108 is stationary even when the vertical shaft is rotating. The pawl 119 serves to prevent retrograde movement of the ratchet wheel and shaft.

The shaft 108 carries at one end a worm 121 which meshes with a worm wheel 122 on a vertical shaft 123. The shaft 123 carries at its upper end a winding drum 124 which is connected with the shaft, preferably by means of a friction clutch 123[a] controlled by a hand wheel 125. 126 is a cable connected to the drum to be wound thereon. The end of this cable may, if desired, be secured, as shown in Fig. 1, to one or another of the vertical studs or holders 127 which are provided on the ring 72. Horizontal idler sheaves 128 are arranged in a circumferential series around the turntable. Irrespective of which holder the end of the cable may be secured to, and irrespective of the position of the turntable, these sheaves 128 serve to guide the cable from the holder tangentially to the edge of the turntable.

It will now be apparent that when the cable is connected to one of these holders, and the winding drum caused to rotate in a winding direction, the winding of the cable will cause the rotation of the turntable about the center of the ring.

Attached to the main frame casting 101 by a plurality of bolts 129 is a bracket 130 having a downward projecting extension 131 shaped to form bearings 132 and 133 in which is journaled a vertical shaft 134. Fixed to the upper end of the shaft 134 is a sprocket wheel 135 connected by a chain 136 with the sprocket wheel 137 on the upper end of the main vertical power shaft 105 by which the shaft 134 is driven. The apertures in the bracket 130, through which the bolts 129 extend, are elongated to admit of longitudinal adjustment by the adjusting screw 138 to regulate the tension of the chain 136.

Formed at the lower end of the extension 131 is a foot 139 which carries the cutter arm 140. The cutter mechanism is of the well known type adapted to be fed side-wise into the coal, which is cut by cutting tools carried by a chain traveling in guide ways of the cutter arm. The foot 139 is adapted to slide between the plates 141 and the bars 142 of the cutter frame to admit of longitudinal adjustment by the adjusting screw 143 to regulate the tension of the cutter chain 144. The cutter chain is driven by a sprocket wheel 145 fixed to the lower end of the shaft 134.

The operation of the machine is as follows. The track upon which the machine travels is positioned on the center line of the mine room. The machine propelled by the motor 12, enters the room with the cutter arm extending forward along the center line of the machine. When the machine has approached sufficiently near to the working face the turntable is rotated to the right until the cutter arm is at right angles with the track. The machine is then moved forward until the distance from the coal face to the center of the turntable shall be equal to the length of the bracket 130 plus a suitable allowance for working clearance. By means of the vertical adjusting mechanism the coal cutting mechanism will then be lowered until the cutter arm is in the desired position to undercut the coal. After the machine has been secured in place, the motor 103 is started and the feed mechanism adjusted to cause the turntable to rotate to the left. As the cutter arm advances into the coal, the hand wheel 118 may be manipulated to effect a variation of the rate of cutting according to the resistance offered by the coal, which will increase as the cutter approaches the center line of the room and decrease from that line to the finish.

When the machine has cut an arc of 180 degrees, it is backed away from the coal face a sufficient distance to allow the cutting mechanism to be elevated into the traveling position; the cutter arm is preferably swung to the central position; and the machine is ready to travel under its own power to the next place of use.

While this device has been primarily designed to cut the coal at the bottom of the vein, it is apparent that it may be adjusted to cut at any elevation within the range of the vertical adjustment. The extension 131 of the bracket 130 may be of any desired length according to the level of cutting desired, and I do not limit myself to a downward extending extension such as I have shown and described. By providing several brackets 130 of different sorts, with corresponding shafts 134, the machine may be adapted for cutting at an extremely wide range of elevations.

Should it be desired to cut the coal from left to right, instead of from right to left as described, it is only necessary to reverse the bits 145 in the cutter chain 144, adjust the feed cable 126 to rotate the turntable in the desired direction, and reverse the direction of the motor 103 by means of the controller 146. In Fig. 1 I have shown by dotted lines the reversed arrangement of the cutter bits and a corresponding arrangement of the feed cable 126.

It will be seen that by providing the offset power connection to the cutter mechanism through the shaft 134 I am enabled to cut a kerf at or below the lowermost plane of the wheels upon which the machine is supported. I believe myself to have been the first to provide a machine of the character herein set forth capable of cutting at this low level.

By means of the power mechanism connected to the screws 80, 81 and 82, I am able to adjust the mechanism vertically; and by disengaging one or two of the clutches 91 and 97, 97 one side of the mechanism can be raised or lowered independently to change the angle of the cutter arm with respect to the horizontal. After the desired angle is obtained, all three of the clutches can be thrown in and the whole cutter mechanism can be raised or lowered in parallelism, the angle of the cutter arm being maintained constant.

It will be observed that the improved machine herein set forth embodies those novel features which I referred to at the outset as characterizing certain earlier machines devised by me; I do not claim herein the said features in their broader aspects as they are claimed in U. S. Patents 1,247,419 and 1,267,675.

The machine herein differs from that in said earlier patents in that the cutter arm and its turntable, or rotary support, had to be brought to a certain predetermined angular position before power could be transmitted from the motor to the track wheels to move the arm and its rotary support bodily along and parallel to the track by means of said motor and track wheels. It is, at times, desirable to thus move the cutting apparatus and its swinging support bodily parallel to the track while the cutter arm is at an angular position other than the central longitudinal position, and this could not be done with the earlier machines.

But in the present apparatus this movement bodily of the arm and its swinging support parallel to the track, can be effected at any time regardless of the angular position of said arm. The clutch for applying the traction power can be thrown at any time to connect the power transmitters between the motor and the track wheels.

And this fact, that the cutter arm and its swinging support, in the earlier mechanism could not be moved bodily parallel to the track by traction power from the track wheels unless the bar was in the said predetermined angulated position, necessitated that the cable be used as the propelling device for moving the cutting mechanism bodily when it was positioned at any angle other than the one predetermined, and for this purpose (of bodily moving the cutting apparatus), the end of the cable had to be attached to an external stationary abutment in front or in rear of the cutting mechanism. That is, the cable was required to move the cutter arm and its swinging support bodily forward and backward parallel to the track, because the locomotive devices for driving the track wheels, had to be thrown out of operative positions when the cutter bar was in any relative position except the one predetermined position referred to, namely, when it was situated in the central vertical planes of the truck.

But, in the present mechanism, the power transmitting devices for rotating the track wheels and bodily moving the cutting arm and its support along the track, are always ready for operation regardless of the angular position of the bar.

Further, it is desirable under the circumstances just described (when the cutter arm is positioned at an angle to the track and is being moved bodily along the same) to hold the arm at that angle and prevent it from swinging relatively backward therefrom. For example, when the cable is arranged on the sheaves, as in Fig. 1, it is frequently desirable to prevent the arm from retracting or hold it against swinging clockwise while being moved bodily parallel to the track. It can, while positioned at any desired angle, be held there by tightening the friction devices at 123, the worm at 121 locking the drum and cable and preventing the arm from retracting clockwise while being bodily propelled. And the worm 121 is held stationary by adjusting the finger 116 to the position in Fig. 8, pawl 111 being then inactive relative to shaft 108 and the worm. The cutter chain may be rotating, but the eccentric rod 113 will move idly.

What I claim is:

1. In a mining machine of the class described, the combination of the wheeled track-guided truck having a bed frame held in rigid relationship to the wheel axis, a laterally swinging frame at the top of the machine comprising a horizontally widely extended approximately circular base frame element mounted on a fixed vertical axis and positioned directly above the bed frame, vertical column-like supports mounted upon and held in fixed relations to the bed frame, a horizontally widely extended ring-like frame element engaging with the extended base frame; arms extending downward from said ring-like element, a plurality of vertical-acting adjusting devices stationary on the bed frame and each adapted to vertically move a part of the said ring-like support independently of the other part, an elongated horizontally extended cutter arm mounted to be fixed in horizontal planes; a bracket extending downward from the base plate and supporting said cutter arm, a motor secured directly to the base plate, and power devices extending from said motor to the cutting apparatus.

2. In a mining machine of the class described, the combination of a wheeled track-guided truck with a rigid bed frame, a horizontally widely extended laterally swinging base frame positioned at the top of the machine and directly above the bed frame and wheel base and mounted on a fixed vertical axis, an elongated horizontally extended cutter arm, a chain carrying cutters and rotating around said arm, a vertically positioned and downward extending bracket rigidly and detachably secured to said widely extended base frame and secured to the cutter arm, a vertical shaft in the said bracket, a sprocket wheel at the upper end of said shaft, a sprocket wheel at the lower end engaging the cutter chain, a motor supported on the swinging base independently of the bracket, and power transmitting devices extending from the motor to said upper sprocket wheel.

3. In a mining machine of the class described, the combination of a wheeled track-guided truck with a vertically fixed bed frame, an elongated horizontally extended cutter arm mounted to be rigidly held in horizontal planes, a laterally swinging horizontally widely extended base frame at the top of the machine positioned over said bed frame and the wheel base, a plurality of column-like supports mounted rigidly on the base frame and held therewith against movement horizontally or vertically, a horizontally widely extended ring-like element engaging with the said horizontally extended base frame, brackets extending downward from said ring-like frame element and respectively engaging loosely with each of the said column-like supports, a motor on and swinging laterally with the base frame for actuating the cutters, a supplemental motor on the bed frame, and power devices actuated thereby for vertically adjusting the said brackets in the said column-like supports.

4. In a mining machine, the combination of a wheel supported base frame, a plurality of upright supports on the base frame, a supporting frame adjustably mounted on the upright supports, a cutting mechanism mounted on the supporting frame to swing with respect thereto about a vertical axis, mechanism adapted to operate optionally in connection with any or all of the upright supports to tip the supporting frame or raise and lower it in parallelism, and a motor to drive said mechanism.

5. In a mining machine, the combination of a wheel supported base frame, a plurality of upright supports on the base frame, a supporting frame adjustably mounted on the upright supports, a cutting mechanism mounted on the supporting frame to swing with respect thereto about a vertical axis, power mechanism adapted to operate in connection with all of the upright supports simultaneously to raise and lower the supporting frame, and means for rendering said mechanism inoperative with respect to any of the upright supports to permit the adjustment of the supporting frame on one or more of the upright supports independently of the other upright supports.

6. In a mining machine, the combination of a wheel supported rigid base frame adapted to run upon and be braced by the rails of a mine track, an elongated laterally swinging endless chain cutter apparatus carried by the base frame and projecting horizontally therefrom, supporting means between the base frame and the cutter apparatus comprising a plurality of upwardly extending supports mounted directly on the base frame at the angles of a horizontal polygon, said supports being stationary horizontally and vertically relatively to the wheels and the base frame, a non-rotary widely extended ring-like frame element carried by the said supports, a horiozntal supporting frame adjustably mounted on the upright supports and in engagement with said ring-like support element and affording a widely extended bearing support for the swinging cutter apparatus directly above the wheel base of the base frame, means for adjusting different parts of said horizontal frame vertically independently of the other parts thereof and power mechanism operable in connection with all of the upright supports simultaneously to raise and lower the supporting frame.

7. In a mining machine, the combination of a wheel supported rigid base frame adapted to run upon and be braced by the rails of a mine track, an elongated laterally swinging endless chain cutter apparatus carried by the base frame and projecting horizontally therefrom, supporting means between the base frame and the cutter apparatus comprising a plurality of rotatable screw shafts extending upward from the base frame at the angles of a horizontal polygon and secured against endwise movement and a horizontal supporting frame adjustably mounted on the screw shafts and affording a widely extended bearing support for the swinging cutter apparatus directly above the wheel base of the base frame, power transmitting devices to rotate the said screw shafts simultaneously to raise and lower the supporting frame and cutter apparatus and a second motor for actuating said power transmitting means.

8. In a mining machine, the combination of a wheel supported base frame, a plurality of upright supports thereon each comprising a rotatable screw shaft secured against endwise movement, supporting frame adjustably mounted on the screw shafts, a horizontally oscillating cutter mechanism having an elongated cutter arm mounted on the supporting frame, and means for rotating optionally any or all of the screw shafts to incline the cutter mechanism or adjust it vertically in parallelism.

9. In a mining machine, the combination of a wheel supported rigid base frame adapted to run upon and be braced by the rails of a mine track, an elongated laterally swinging endless chain cutter apparatus carried by the base frame, and projecting horizontally therefrom, supporting means between the base frame and the cutter apparatus comprising a plurality of upright supports extending upward from and rigidly secured to the base frame at the angles of a horizontal polygon and a horizontal supporting frame adjustably mounted on the upright supports and affording a widely extended bearing support for the swinging cutter apparatus directly above the wheel base of the base frame, a motor on said horizontal supporting frame for actuating the cutters, a second motor mounted on the base frame, and mechanism actuated thereby and adapted to operate in connection with all of the upright supports simultaneously to raise and lower the supporting frame and cutter apparatus.

10. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor, transmission means between said motor and said adjusting means, and a kerf cutter secured on said support.

11. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor, transmission means between said motor and said adjusting means, a depending bracket secured to said support, and a kerf cutter secured to the lower end of said bracket.

12. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor mounted on said base frame exteriorly of the support, controllable transmission means between said motor and said adjusting means, and a kerf cutter secured on said support.

13. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor, transmission means between said motor and said adjusting means, controllable transmission means between said motor and the supporting wheels for said base frame, and a kerf cutter secured on said support.

14. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor controllable transmission means between said motor and said adjusting means, a kerf cutter including a frame secured to said support and a cutter chain circulatable about said frame, and a second motor for driving said chain.

15. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor mounted on said base frame exteriorly of the support, controllable transmission means between said motor and said adjusting means, a kerf cutter including a frame secured to said support and a cutter chain circulatable about said frame, and a second motor mounted on the support for driving said chain.

16. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor mounted on said base frame exteriorly of the support, controllable transmission means between said motor and said adjusting means, a kerf cutter including a frame secured to said support and a cutter chain circulatable about said frame, a second motor mounted on the support for driving said chain, and means driven by said second motor for swinging said support about said substantially vertical axis.

17. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor, controllable transmission means between said motor and said adjusting means, controllable transmission means between said motor and the supporting wheels for said base frame, a kerf cutter including a frame secured to said support and a cutter chain circulatable about said frame, and a second motor for driving said chain.

18. In a mining machine of the class described, the combination of a wheel supported base frame, a support mounted on said base frame for rotation about a substantially vertical axis, means for vertically adjusting said support in parallelism to the base frame or for tilting the support relative to the base frame, a motor on the base frame exteriorly of said support, controllable transmission means between said motor and said adjusting means, controllable transmission means between said motor and the supporting wheels for said base frame, a kerf cutter including a frame secured to said support and a cutter chain circulatable about said frame, a second motor mounted on said support, connections between said second motor and cutter chain for driving the latter, and means driven by said second motor for swinging said support about said substantially vertical axis.

19. In a mining machine, a support, traction devices carrying said support, adjustable pedestals interposed between the traction devices and said support, motor driven means for adjusting said pedestals in unison to effect vertical translational movement of said support, said pedestals being differentially adjustable to tilt the support relative to the traction devices, and a kerf cutter mounted on said support and projecting therefrom.

20. In a mining machine, a support, traction devices carrying said support, adjustable pedestals interposed between the traction devices and said support, motor driven means for adjusting said pedestals in unison to effect vertical translational movement of said support, said pedestals being differentially adjustable to tilt the support relative to the traction devices, a kerf cutter mounted on said support and projecting the frame, and self-contained power devices adapted to drive said traction devices in all adjusted positions of the support.

21. In a mining machine, a support, traction devices carrying said support, adjustable pedestals interposed between the traction devices and said support, a motor, means drivable by said motor for adjusting said pedestals in unison to effect vertical translational movement of said support, said pedestals being differentially adjustable by tilting the support relative to the traction devices, a kerf cutter mounted on said support and projecting therefrom, and transmission means between the motor and traction devices operable in all adjusted positions of the support.

22. In a mining machine, a support, traction devices carrying said support, adjustable pedestals interposed between the traction devices and said support, means simultaneously or selectively operable to adjust said pedestals to elevate said support translationally or to tilt it relative to said traction devices, a motor, controllable driving connections between said motor and said adjusting means, and a kerf cutter mounted on said support and projecting therefrom.

23. In a machine of the class described, a carriage including front and rear wheels, a cutter bar mounted on said carriage and projecting therefrom, a motor on said carriage and means driven by the motor for tilting said cutter bar relative to the plane of the wheel axes.

24. In a machine of the class described, a carriage including front and rear wheels, a cutter bar mounted on said carriage and projecting therefrom, a motor on said carriage, and controllable means driven by the motor for vertically translating the cutter bar relative to said wheels or for tilting the cutter bar relative to the plane of the wheel axes.

25. In a mining machine, a support, traction devices carrying said support, a kerf cutter in connection with said support and projecting therefrom, a motor, and means driven by said motor for tilting the support and therewith the cutter bar in a fore and aft direction relative to said traction devices.

26. In a mining machine, a support, traction devices carrying said support, a kerf cutter in connection with said support and projecting therefrom, a motor, and means driven by said motor for universally tilting the support and therewith the cutter bar relative to the traction devices.

27. In a mining machine, a support, a kerf cutter in connection with said support and projecting therefrom, traction devices, a plurality of horizontally spaced adjustable members interposed between the traction devices and support and spaced in a fore and aft direction relative to said traction devices to transmit the weight of the support to the traction devices, a motor, and controllable means driven from the motor to adjust said members in unison to effect vertical translational movement of the support and kerf cutter relative to the traction devices or to adjust one of the members relative to another to tilt the support and kerf cutter in a fore and aft direction relative to the traction devices.

28. In a machine of the class described, a support, a kerf cutter in connection with said support and projecting therefrom, traction devices, a plurality of horizontally spaced adjustable members interposed between the support and traction devices for transmitting the weight of the former to the latter, a motor, and controllable means driven from the motor to adjust said members in unison to effect vertical translational movement of the support and kerf cutter relative to the traction devices or to adjust one of said members relative to another to tilt the support and kerf cutter relative to the traction devices.

29. In a machine of the class described, a support, a kerf cutter in connection with said support and projecting therefrom, traction devices, a plurality of horizontally spaced adjustable members interposed between the support and traction devices for transmitting the weight of the former to the latter, a motor, means including clutch means driven from the motor to adjust said members in unison to effect vertical translational movement of the support and kerf cutter relative to the traction devices, said clutch means being operable to disconnect the drive to the adjusting means of one of the members whereby adjustment of another member causes tilting of the support and kerf cutter relative to the traction devices.

30. In a machine of the class described, a support, a kerf cutter in connection with the support and projecting therefrom, traction devices carrying the support, means for adjusting the support and kerf cutter relative to the traction devices, said means including a plurality of nuts and rotatable screws engaging the nuts, a motor, means including clutch means driven from the motor to drive one or all of said screws to displace a single nut or all the nuts simultaneously whereby the support and cutter may be tilted or vertically translated.

NILS D. LEVIN.